(12) United States Patent
Pintat

(10) Patent No.: US 11,466,578 B2
(45) Date of Patent: Oct. 11, 2022

(54) TURBINE NOZZLE FOR A TURBINE ENGINE, COMPRISING A PASSIVE SYSTEM FOR REINTRODUCING BLOW-BY GAS INTO A GAS JET

(71) Applicant: SAFRAN AIRCRAFT ENGINES, Paris (FR)

(72) Inventor: Ludovic Pintat, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/251,546

(22) PCT Filed: Jun. 12, 2019

(86) PCT No.: PCT/FR2019/051416
§ 371 (c)(1),
(2) Date: Dec. 11, 2020

(87) PCT Pub. No.: WO2019/239064
PCT Pub. Date: Dec. 19, 2019

(65) Prior Publication Data
US 2021/0254483 A1    Aug. 19, 2021

(30) Foreign Application Priority Data

Jun. 15, 2018    (FR) ...................................... 18 55264

(51) Int. Cl.
*F01D 9/02* (2006.01)
*F01D 11/04* (2006.01)

(52) U.S. Cl.
CPC ................ *F01D 9/02* (2013.01); *F01D 11/04* (2013.01); *F05D 2220/323* (2013.01);
(Continued)

(58) Field of Classification Search
CPC ..... F01D 9/00; F01D 9/02; F01D 9/04; F01D 9/041; F01D 9/042; F01D 5/145;
(Continued)

(56) References Cited

U.S. PATENT DOCUMENTS

| 3,846,038 A | 11/1974 | Carriere et al. |
| 2009/0263233 A1 | 10/2009 | Guemmer |

(Continued)

FOREIGN PATENT DOCUMENTS

| FR | 2 166 494 | 8/1973 |
| FR | 3 034 129 A1 | 9/2016 |
| JP | 55-146201 A | 11/1980 |

OTHER PUBLICATIONS

International Search Report dated Oct. 24, 2019 in PCT/FR2019/051416 filed on Jun. 12, 2019, 3 pages.
(Continued)

*Primary Examiner* — Eldon T Brockman
*Assistant Examiner* — Elton K Wong
(74) *Attorney, Agent, or Firm* — Oblon, McClelland, Maier & Neustadt, L.L.P.

(57) ABSTRACT

A turbine nozzle for an aircraft turbine engine, the nozzle including at least one vane and a base having a platform. The nozzle is fitted with a passive system for reintroducing blow-by gas into the primary jet, the passive system including gas extraction ports on the base as well as gas reinjection ports on the radially outer surface of the platform and/or on a suction-side surface of the vanes, the gas reinjection ports being designed to redirect the gas flow in a reinjection direction having a circumferential orientation.

8 Claims, 5 Drawing Sheets

(52) U.S. Cl.
CPC .... *F05D 2240/128* (2013.01); *F05D 2240/55* (2013.01); *F05D 2260/60* (2013.01)

(58) Field of Classification Search
CPC .. F01D 11/001; F01D 11/04; F05D 2240/128; F05D 2240/55; F05D 2260/60; F05D 2220/323
See application file for complete search history.

(56) References Cited

U.S. PATENT DOCUMENTS

| | | | |
|---|---|---|---|
| 2009/0317232 A1* | 12/2009 | Guemmer | F04D 29/684 415/58.5 |
| 2013/0064673 A1 | 3/2013 | Domercq et al. | |
| 2014/0023483 A1* | 1/2014 | Wiebe | F01D 5/18 415/115 |
| 2016/0169014 A1* | 6/2016 | Beaujard | F01D 5/3015 415/209.3 |

OTHER PUBLICATIONS

French Search Report (with English translation of categories) dated Feb. 8, 2019 in French Application No. 18 55264 filed on Jun. 15, 2018, 2 pages.

\* cited by examiner

TURBINE NOZZLE FOR A TURBINE ENGINE, COMPRISING A PASSIVE SYSTEM FOR REINTRODUCING BLOW-BY GAS INTO A GAS JET

TECHNICAL FIELD

The invention relates to the field of turbines for turbine engines, preferably for aircraft, and in particular the field of turbine nozzles. It is applicable to any type of turbine engine, such as for example a turbojet engine or a turboprop engine.

STATE OF THE PRIOR ART

Turbine engine turbines are conventionally formed by mobile wheels and nozzles, arranged in alternation along the axial direction of the turbine engine. An example of design of such a turbine is for example known from the document FR 3 034 129 A1.

At the junction between a mobile wheel and a nozzle located downstream, a gas blow-by flow is conventionally observed, which escapes from a gas jet from the turbine engine, to reach a cavity arranged under the radially internal platform of the nozzle. The blow-by gas flow is usually reinjected into the jet downstream from the nozzle, by following a clearance located between the latter and the mobile wheel located downstream. Consequently, this blow-by flow is reinjected into the jet with a globally radial direction, clearly different from the flow direction of the primary flow in the jet.

This reintroduction of the gas blow-by flow thus generates aerodynamic disturbances on the primary flow, causing efficiency losses.

SUMMARY OF THE INVENTION

To at least partially address the problem mentioned above, the invention firstly relates to a turbine nozzle for a turbine engine, preferably for an aircraft turbine engine, equipped with a passive system for reintroducing blow-by gas into the jet, the system including gas extraction orifices located on the foot, as well as gas reinjection orifices located on the radially external surface of a platform and/or on an upper surface of at least one vane, the gas reinjection orifices being configured to redirect the gas flow from the gas blow-by cavity along a reinjection direction including a circumferential orientation, and the reinjection direction has a radial orientation such that, viewed along an axial cross-section through any one of the gas reinjection orifices, the reinjection direction is parallel or substantially parallel locally with the radially external surface of the platform.

The invention thus enables the gas blow-by flow in the jet to be redirected with a circumferential orientation giving it a direction closer to that of the primary flow flowing in the jet. The aerodynamic disturbances caused by reintroducing the blow-by air are thus advantageously reduced, and the efficiency of the turbine engine is hence improved. Furthermore, with the reinjection direction having a radial orientation such that, viewed along an axial cross-section through any one of the gas reinjection orifices, this reinjection direction is parallel or substantially parallel locally with the radially external surface of the platform, it is possible to approach the flow direction of the primary flow in the jet even further, so as to disturb same as little as possible. More generally, it is preferentially ensured that the blow-by air reinjection direction is substantially identical to the flow direction of the primary flow in the jet.

The invention preferably includes at least any one of the following optional features, taken in isolation or in combination.

The nozzle comprises channels connecting pairwise the gas extraction orifices, and the gas reinjection orifices located on the radially external surface of the platform. By providing simple channels connecting the foot to the platform, the invention can easily be implemented, for example by additive manufacturing of this nozzle. Alternatively, the extraction orifices and the reinjection orifices communicate with one or more internal cavities provided in the platform, so as to facilitate air circulation, reduce the mass of the nozzle, and facilitate the manufacture thereof.

Said gas reinjection orifices open onto a downstream part of the radially external surface of the platform, and/or onto a radially internal part of the upper surface of said at least one vane. These preferred zones are those where the primary flow has the lowest pressure, which enables the passive reintroduction of the blow-by air to be easily ensured. In this regard, it is noted that the passive nature of the system for reintroducing blow-by gas implies that gas is reinjected into the jet naturally, merely by fluid pressure differential, i.e. in particular without the intervention of an electrically powered external device such as a pump.

Preferably, the gas extraction orifices open onto a downstream surface from the foot.

These gas extraction orifices are preferentially arranged on a stilt of the foot.

The foot includes an axial tab extending downstream, and the gas extraction orifices are preferentially arranged between the radially internal surface of the platform, and said axial tab.

Preferably, the axial tab extends axially so as to have an axial overlap zone with an upstream spoiler of a mobile wheel arranged downstream from this nozzle. This enables the reintroduction of gas into the bottom of the blow-by cavity to be limited, delimited radially outward by the foot platform.

The nozzle extends over an angular sector less than 360° to form a nozzle sector, or over an angular sector equal to 360° to form an annular nozzle.

The invention also relates to a turbine engine turbine, preferably for aircraft, comprising at least one such nozzle arranged between two mobile turbine wheels.

Finally, the invention relates to a turbine engine, preferably for aircraft, comprising at least one such turbine, the turbine engine being of the turbojet or turboprop engine type.

Further advantages and features of the invention will emerge in the non-limiting detailed description below.

BRIEF DESCRIPTION OF THE DRAWINGS

This description will refer to the appended drawings wherein.

DETAILED DESCRIPTION OF SPECIFIC EMBODIMENTS

Figure 1:
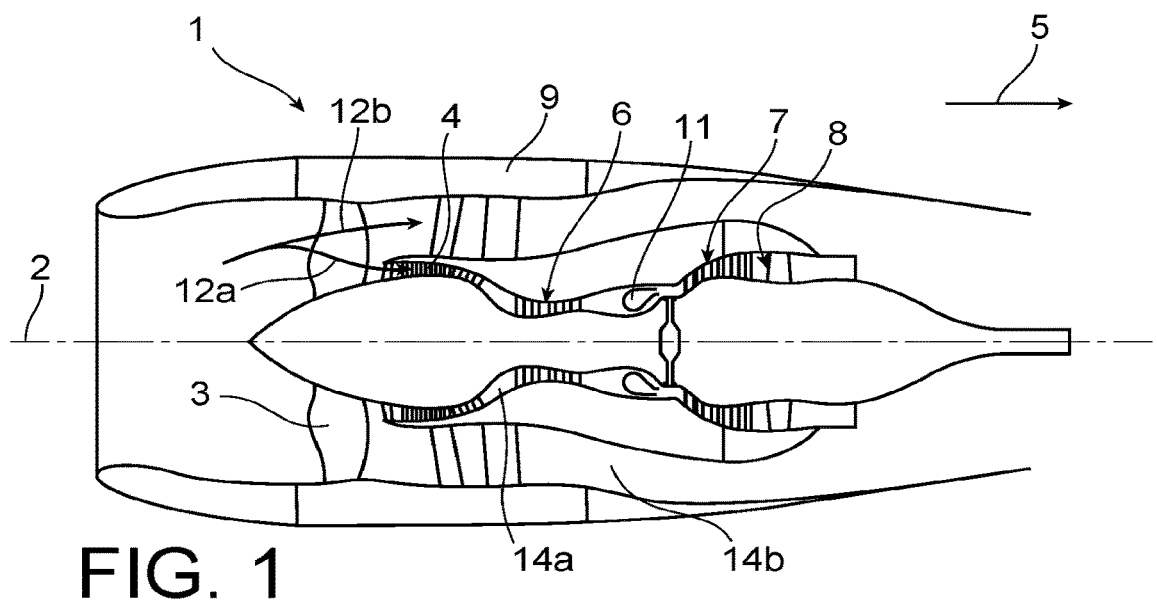
FIG. 1 is a schematic axial cross-sectional view of a dual-flow turbojet engine according to the invention.

With reference first of all to FIG. 1, an aircraft turbine engine 1, according to a preferred embodiment of the invention, is represented. This consists of a dual-flow, double-body turbojet engine. Nevertheless, it could consist of a turbine engine of another type, for example a turboprop engine, without leaving the scope of the invention.

The turbine engine 1 has a longitudinal central axis 2 about which the different components thereof extend. It comprises, from upstream to downstream along a main gas flow direction 5 through this turbine engine, a fan 3, a low-pressure compressor 4, a high-pressure compressor 6, a combustion chamber 11, a high-pressure turbine 7 and a low-pressure turbine 8.

Conventionally, after having traversed the fan, the air is split into a central primary flow 12a and a secondary flow 12b surrounding the primary flow. The primary flow 12a flows into a primary gas jet 14a through the compressors 4, 6, the combustion chamber 11 and the turbines 7, 8. The secondary flow 12b flows for its part into a secondary jet 14b delimited radially externally by an engine casing, surrounded by a nacelle 9.

Figure 2:
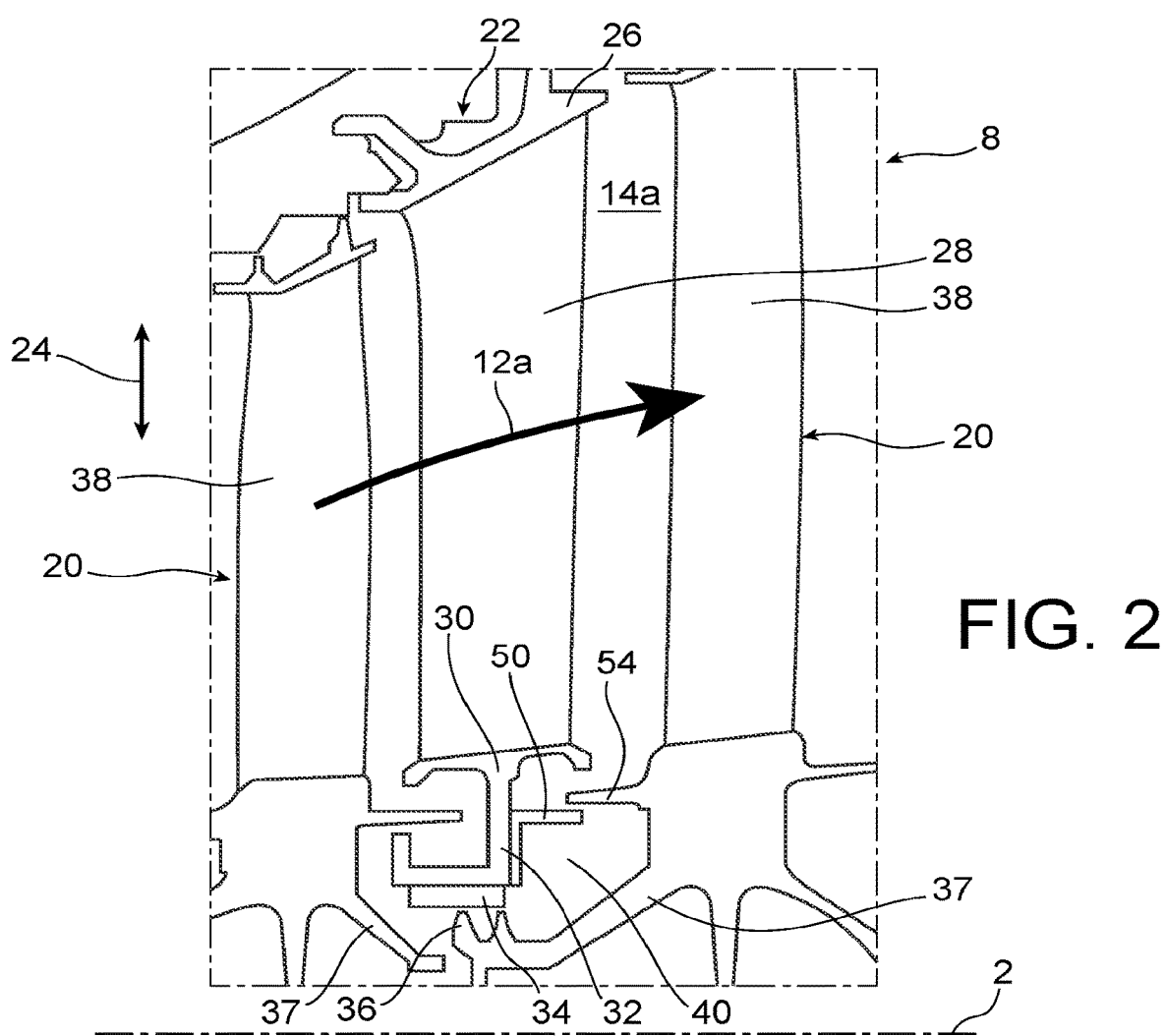
FIG. 2 represents an axial cross-sectional view of a part of a turbine of the turbojet engine shown in FIG. 1.
Figure 3:
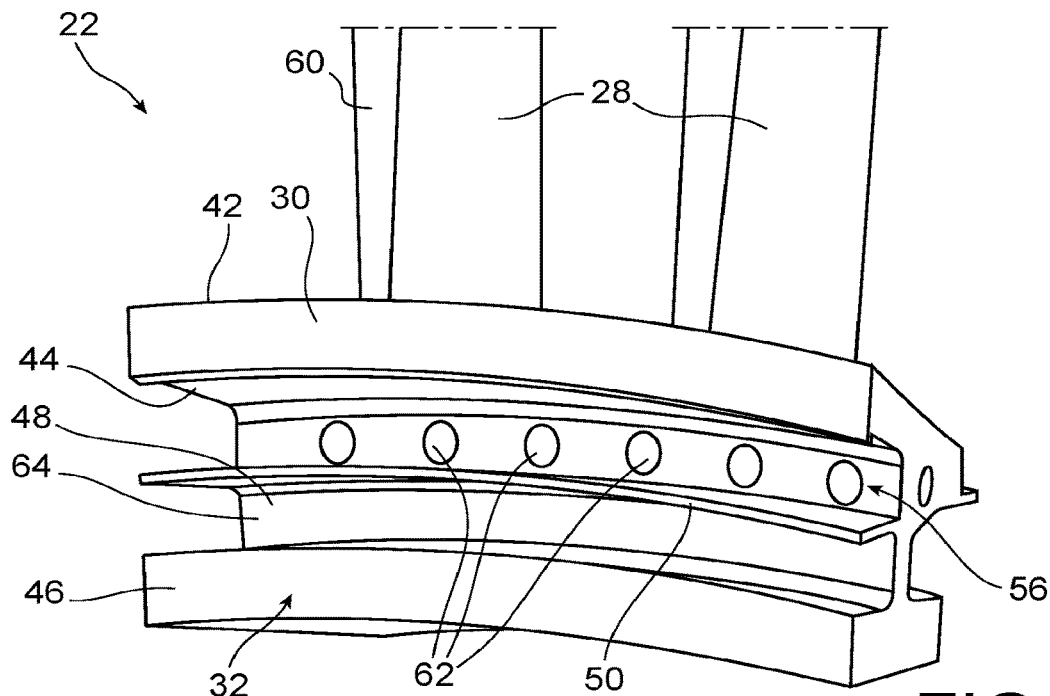
FIG. 3 represents a perspective view of a part of the nozzle of the turbine shown in FIG. 2.
Figure 4:
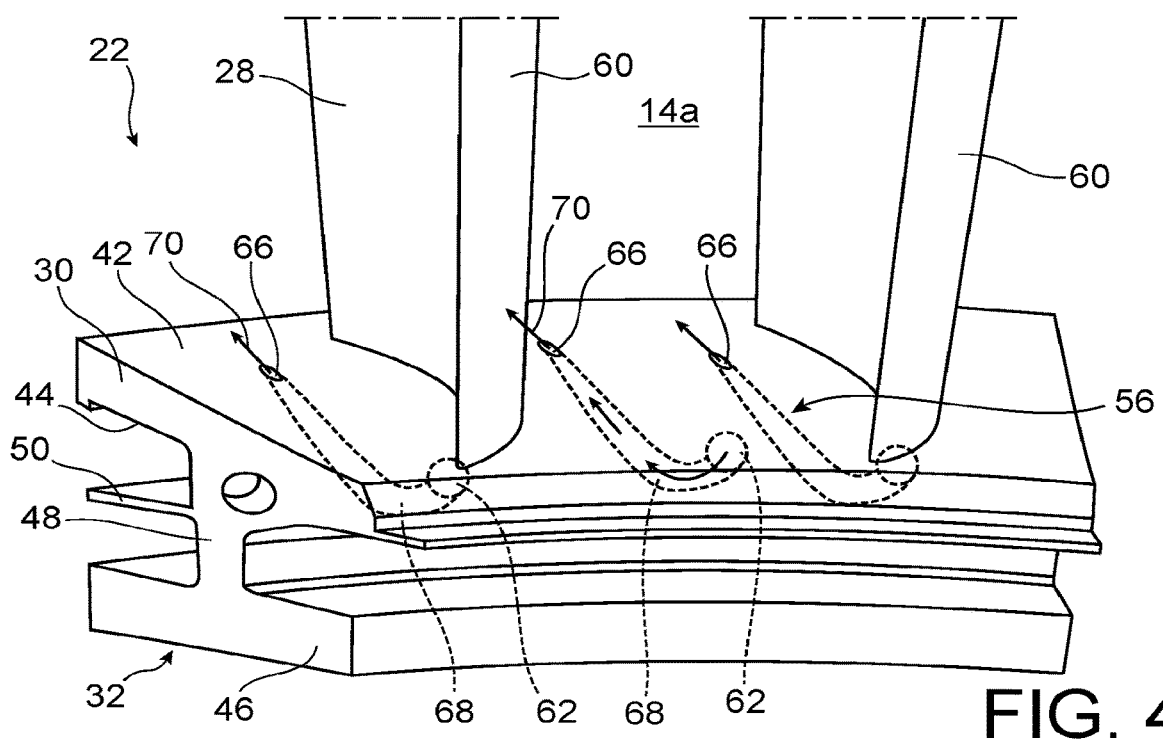
FIG. 4 represents a perspective view equivalent to the previous one, from another viewing angle.

FIG. 2 represents a part of the low-pressure turbine 8 in more detail. Nevertheless, the invention could also apply to the high-pressure turbine 7, without leaving the scope of the invention.

This turbine 8 has an alternation of mobile wheels 20 and nozzles 22. In FIG. 2, two mobile wheels 20 have been represented, between which a nozzle 22 is located, corresponding to a stator portion of the turbine.

Along a radial direction of the turbine represented schematically by the arrow 24, the nozzle successively includes a radially external platform 26, vanes 28, and a foot 32 which has a radially internal platform 30. The foot 32 has at the level of the inner surface thereof an abradable coating 34, cooperating with sealing elements 36 borne by fastening flanges 37 of the two mobile wheels 20 located on either side of the nozzle 22. These elements 34, 36 form a labyrinth seal.

In operation, the primary flow 12a flows in the jet 14a traversed by the fixed vanes 28, as well as by rotor vanes 38 of the mobile wheels 20. At the level of the junction of the radially internal platforms of the upstream mobile wheel 20 and the distributor 22, a blow-by flow is observed corresponding to gas from the primary flow 12a, which is headed towards a blow-by cavity 40 located under the platform 30. This cavity 40, delimited in part by the fastening flanges 37 of the two mobile wheels 20, houses a part of the annular foot 32 of the nozzle. The blow-by gas, after transiting via the labyrinth seal 34, 36, is liable to escape via a clearance arranged between the platform 30 of the nozzle 22, and the radially internal platform of the downstream mobile wheel 20. In order to avoid this reintroduction of harmful gas for the primary flow, the invention envisages the use of a passive system for reintroducing gas into the primary jet. This system will now be described with reference to FIGS. 3 to 7.

With reference to these figures, it is firstly indicated that the invention is also applicable both to an annular nozzle, namely extending over 360°, and to a nozzle sector extending over an angular sector less than 360°. In the latter case, the nozzle is conventionally obtained by placing several sectors end-to-end, so as to form a complete annular structure.

Hereinafter, reference is made to a "nozzle" to describe either an angular sector less than 360° intended to form a nozzle sector, or an angular sector equal to 360° intended to form the entire annular nozzle.

The radially internal platform 30 has firstly a radially external surface 42 partially delimiting the primary jet 14a. It is from this external surface 42 that the vanes 28 extend, protruding radially outwards. The surface 42 has herein a frustoconical shape, of increasing diameter in the downstream direction. The radial inclination "Ir" of this surface 42 is of the order of −45 to 45°. It corresponds in the axial cross-section to the angle "Ir" between the surface 42 and the axial direction parallel with the axis 2.

Moreover, the radially internal platform 30 has a radially internal surface 44 partially delimiting the gas blow-by cavity 40, arranged under the platform 30. It is from this internal surface 44 that the rest of the foot 32 extends, protruding radially inwards. This foot 32 actually includes several parts, and in particular a bulb 46 corresponding to a solid portion forming the internal periphery of the foot, as well as a stilt 48 of more tapered shape, providing the mechanical junction between the bulb 46 and the platform 30. The bulb 46 has at the level of the inner surface thereof the abovementioned abradable coating, this coating having features enabling same to be worn easily and to be of low mass. For example, this abradable coating is made in a honeycomb pattern.

Furthermore, the foot includes an axial tab 50 projecting downstream from the stilt 48, substantially orthogonally thereto. This tab 50 extends circumferentially over the same angular range as the rest of the nozzle 22. It extends moreover axially such that an upstream spoiler 54 of the downstream mobile wheel 20 has an axial overlap zone with this tab 50 as well as with the platform 30, as can be seen in FIG. 2. The parts overlapping along the axial direction follow one another along the radial direction 24. It is noted that the axial tab 50 overlaps with the upstream spoiler 54 to limit the reintroduction of gas into the bottom of the cavity 40.

One of the specificities of the intention lies in the layout of a passive system for reintroducing blow-by gas into the primary jet 14a. This system 56 is directly integrated in the nozzle 22, and the passive nature thereof requires only the formation of orifices, channels, cavities, or similar elements. Indeed, to carry out this reintroduction of at least a part of the blow-by gases, the latter are extracted at the level of the foot 32 then reinjected at the level of one or more zones of the nozzle 22 wherein the pressure of the primary flow 12a is less than that of the blow-by gases in the cavity. In other words, low-pressure zones observed on the external surface 42 of the platform 30, and/or on an upper surface 60 of the vanes 28, are made use of to induce an intake of the gases located in the blow-by cavity 40. No electrically powered external device is therefore required, such that the overall efficiency of the turbine engine is not degraded.

For this purpose, the system 56 comprises gas extraction orifices 62, preferably opening onto a downstream surface of the stilt 48, between the surface 44 of the platform 30 and the axial tab 50. Nevertheless, these extraction orifices 62 could be arranged at other locations on the foot 32, and in particular at any point of the stilt 48 including under the axial tab 50, or indeed on the radially internal surface 44 of the platform 30.

Figure 9:
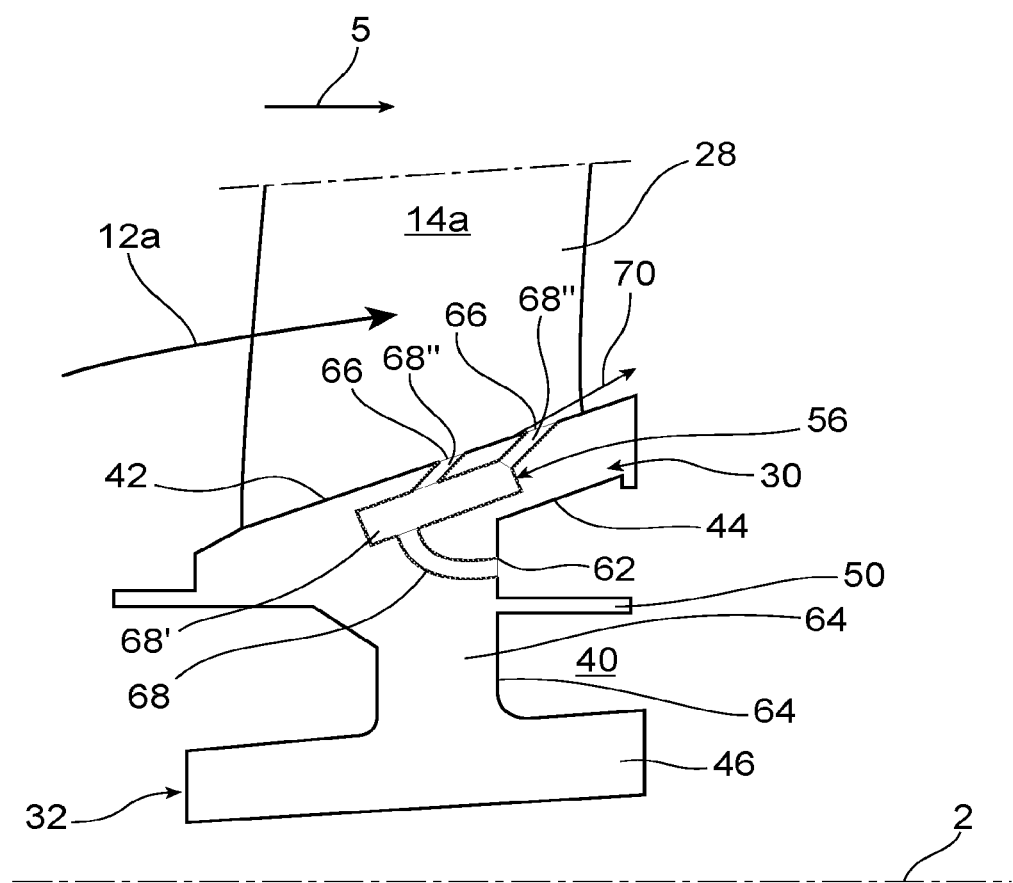
FIG. 9 represents a similar view to that of FIG. 5, where the nozzle is found according to an alternative embodiment.

It consists for example of an annular row of extraction orifices 62, centred on the axis 2. The system also includes orifices 66 for reinjecting gas into the primary jet 14a. These orifices 66 open onto the external surface 42 of the platform 30, preferably on a downstream part of this surface 42 where the pressure of the primary flow 12a is lowest. To connect these orifices 62, 66 pairwise, the reintroduction system 56 comprises channels 68 extending into the material of the stilt 48 and the platform 30. These channels can be embodied using cores in the case of a manufacture of the nozzle 22 by foundry. They can also be easily obtained when producing the nozzle 22 by additive manufacture. Using these same manufacturing techniques, it is possible to arrive at an alternative embodiment wherein the orifices 62, 66 communicate with one or more internal cavities 68' provided in the platform 30, as represented schematically in FIG. 9. In other words, each internal cavity 68' is envisaged to ensure the communication between one or more extraction orifices 62, and one or more reinjection orifices 66. For example, it can consist of a single internal cavity such as an annular internal cavity 68' ensuring the communication between all the orifices 62, 66. This alternative embodiment facilitates the production of the nozzle according to the invention, and/or enhances the performance thereof by reducing the mass thereof. Furthermore, air circulation is facilitated therein.

In this other configuration, channels 68 can be retained between the extraction orifices 62 and the internal cavity/cavities 68', just as channels 68" can be arranged to connect the reinjection orifices 70 to the internal cavities 68'.

One of the advantages provided by reintroducing gas via the nozzle 22 lies in the option of applying the desired direction to the blow-by gas flow reinjected into the primary jet 14a. This reinjection direction, represented schematically by the arrows 70 and defined by the shape of the orifices 66 and the channels 68, can thus be identical or substantially identical to the flow direction of the primary flow 12a in the primary jet, near the gas reinjection orifices 66. This reinjection direction 70 hence proves to be circumferentially inclined, in other words having a circumferential orientation, as specified hereinafter.

Figure 6:
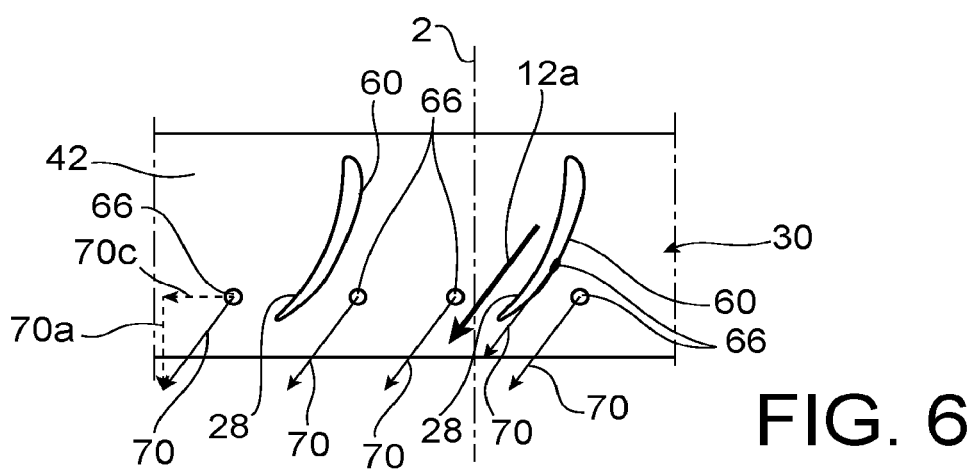
FIG. 6 represents the nozzle shown in FIGS. 3 to 5, in a radial external view.

In particular, the reinjection direction 70 indeed has a circumferential orientation 70c represented schematically in FIG. 6, of the same direction as that of the circumferential orientation conventionally observed on the primary flow 12a, locally near the orifice 66 in question. For this reason, in a radial external view such as that in FIG. 6, the reinjection direction 70 can be parallel or substantially parallel to the direction of the primary flow 12a, since these two directions have the same or substantially the same circumferential orientation. In this regard, it is noted that an angular deviation of plus or minus 10° is preferentially tolerated between the two circumferential orientations of these directions.

Thus, thanks to this single circumferential orientation 70c, also known as circumferential or tangential component obviously having a non-zero value, the blow-by gas flow is reinjected into the primary jet 14a with a direction closely approaching that of the primary flow 12a. Consequently, the aerodynamic disturbances caused by reintroducing blow-by air into the jet are advantageously reduced.

Figure 5:
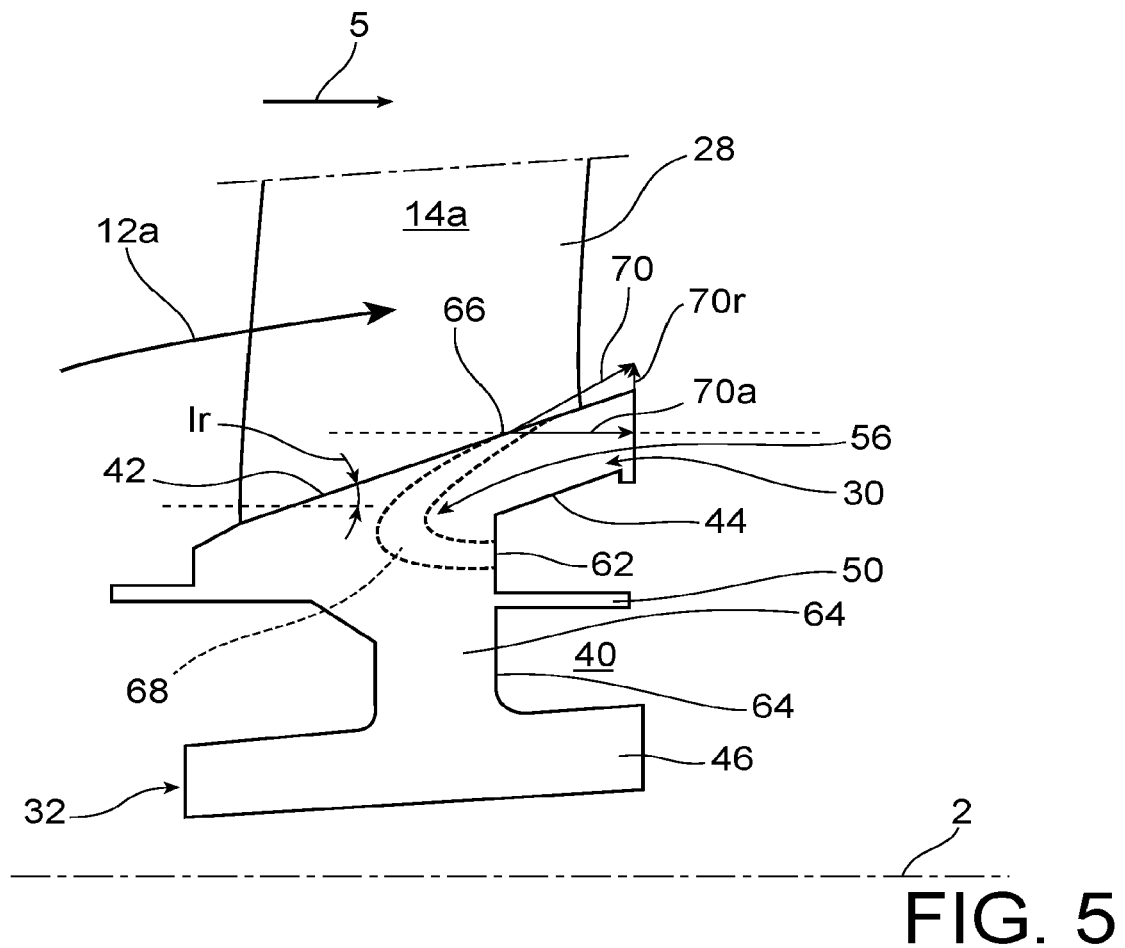
FIG. 5 represents an enlarged axial cross-sectional view of the nozzle shown in FIGS. 3 and 4.

To reduce these disturbances even further, the reinjection direction 70 also has a radial orientation 70r, represented schematically in FIG. 5. The radial orientation 70r is retained such that, viewed along an axial cross-section passing through any one of the orifices 66 such as the cross-section in FIG. 5, the reinjection direction 70 is parallel or substantially parallel locally with the surface 42 of the platform 30. A few degrees of deviation are tolerated, for example up to 5 to 10°, as seen in FIG. 5. Here also, it is specified that having a radial orientation implies that the reinjection direction comprises a non-zero radial component.

Thus, the circumferential orientation/component 70c, the radial orientation/component 70r, and the axial orientation/component 70a form a reinjection direction 70 identical or substantially identical to the flow direction of the primary flow 12a in the primary jet, near the orifices 66 for reinjecting gas which herein also take the form of an annular row centred on the axis 2. Further arrangements of these reinjection orifices 66 are also possible, without leaving the scope of the invention.

Figure 7:
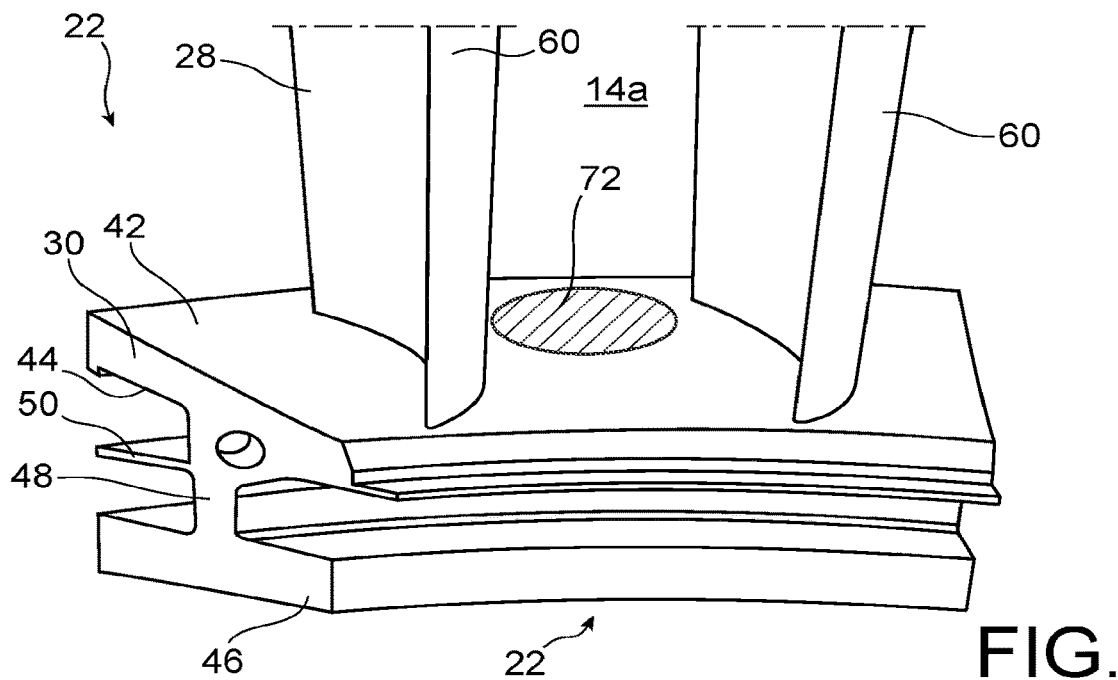
FIG. 7 represents a perspective view equivalent to that in FIG. 4, schematically representing the preferred layout of the gas reinjection orifices on the platform.

In this regard, it is indicated that the preferred location of the orifices 66 on the surface 42 of the platform is indeed located in a downstream part 72 thereof, close to the downstream end of the platform and preferably substantially at the same level as the trailing edges of the vanes 28, as represented schematically in FIG. 7.

Figure 8:
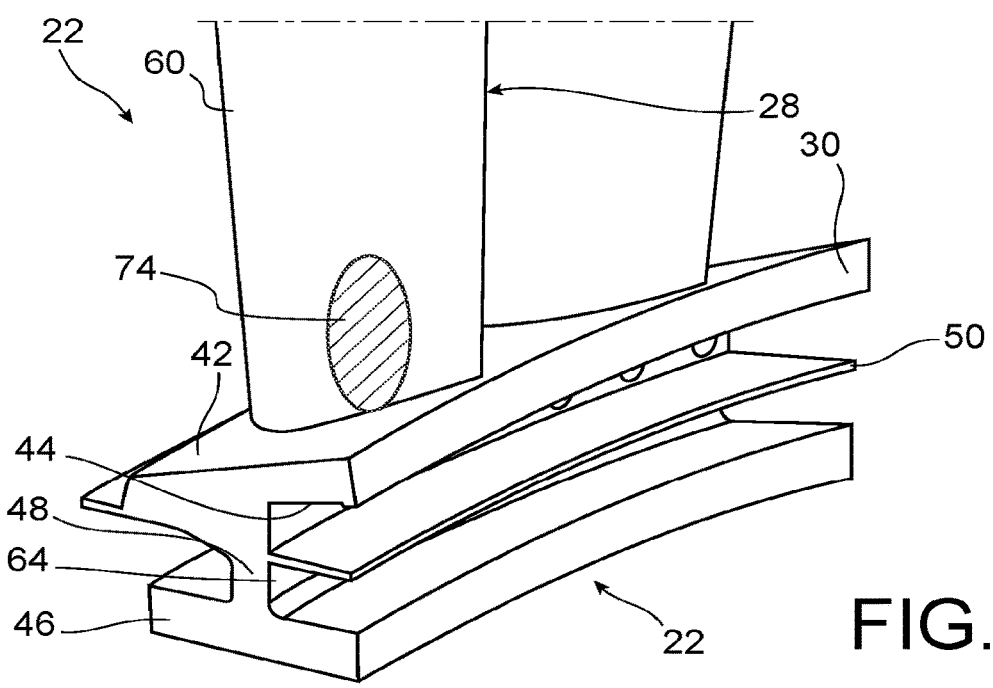
FIG. 8 represents a perspective view equivalent to that in FIG. 4, schematically representing the preferred layout of the gas reinjection orifices on the upper surface of the vane.

Alternatively or simultaneously, gas reinjection orifices 66 could be provided on the upper surface 60 of some or each of the vanes 28 of the nozzle 22. In this scenario, the preferred location of the orifices is located in a radially internal part 74 of this surface, near the junction with the platform 30, as represented schematically in FIG. 8. The connection between the extraction orifices and the reinjection orifices is then made in an equivalent manner, using channels and/or cavities enabling the fluidic communication thereof. The orifices 66 of the radially internal part 74 have been represented schematically in FIG. 6.

In both cases, the parts 72, 74 are preferred zones where the primary flow 12a has the lowest pressure, which enables the passive reintroduction of the blow-by air into the jet 14a to be carried out easily, without degrading performances.

Obviously, various modifications can be made by those skilled in the art to the invention described above, merely by way of non-limiting examples and within the scope covered by the appended claims.

The invention claimed is:

1. A turbine nozzle for a turbine engine comprising:
   at least one vane; and
   a foot which has a platform, the platform comprising a radially external surface from which each vane extends and intended to partially delimit a gas jet from the turbine engine, and a radially internal surface intended to partially delimit a gas blow-by cavity radially under the platform,
   wherein the nozzle is equipped with a passive system for reintroducing blow-by gas into the jet, the system comprising
      gas extraction orifices located on the foot, and
      gas reinjection orifices located on an least one of the radially external surface of the platform or an upper surface of said at least one vane, said gas reinjection orifices being configured to redirect the gas flow from the gas blow-by cavity along a reinjection direction comprising a circumferential orientation,
   wherein said reinjection direction has a radial orientation such that, viewed along an axial cross-section through any one of the gas reinjection orifices, said reinjection direction is parallel locally with the radially external surface of the platform, wherein said gas reinjection orifices open onto at least one of a downstream part of the radially external surface of the platform or a radially internal part of the upper surface of said at least one vane, wherein the foot includes an axial tab extending downstream, wherein the gas extraction orifices are arranged between the radially internal surface of the platform and said axial tab, and wherein the axial tab extends axially so as to be configured to present an axial overlap zone with an upstream spoiler of a mobile wheel arranged downstream from the nozzle when in an assembly with the mobile wheel.

2. The nozzle according to claim 1, comprising channels connecting pairwise the gas extraction orifices, and the gas reinjection orifices located on the radially external surface of the platform, or wherein the extraction orifices and the reinjection orifices communicate with one or more internal cavities provided in the platform.

3. The nozzle according to claim 1, wherein the gas extraction orifices open onto a downstream surface of the foot.

4. The nozzle according to claim 1, wherein the gas extraction orifices are arranged on a stilt of the foot.

5. The nozzle according to claim 4, wherein the foot includes a bulb forming an inner periphery of the foot, the stilt provides a mechanical junction between the bulb and the platform, and an inner surface of the bulb includes an abradable coating.

6. A turbine for a turbine engine, comprising at least one nozzle according to claim 1, arranged between two mobile turbine wheels.

7. A turbine engine, comprising at least one turbine according to claim 6.

8. The nozzle according to claim 1, wherein the radially external surface presents a frustoconical shape of increasing diameter in a downstream direction.

* * * * *